F. W. YOUNG.
Seed-Droppers.

No. 135,743.

Patented Feb. 11, 1873.

Witnesses:
E. Wolff
C. Sedgwick

Inventor:
F. W. Young
per
Attorneys.

AM. PHOTO-LITHOGRAPHIC CO. N.Y. (OSBORNE'S PROCESS.)

UNITED STATES PATENT OFFICE.

FRANK W. YOUNG, OF HOLDEN, MISSOURI.

IMPROVEMENT IN SEED-DROPPERS.

Specification forming part of Letters Patent No. 135,743, dated February 11, 1873.

*To all whom it may concern:*

Figure 1:
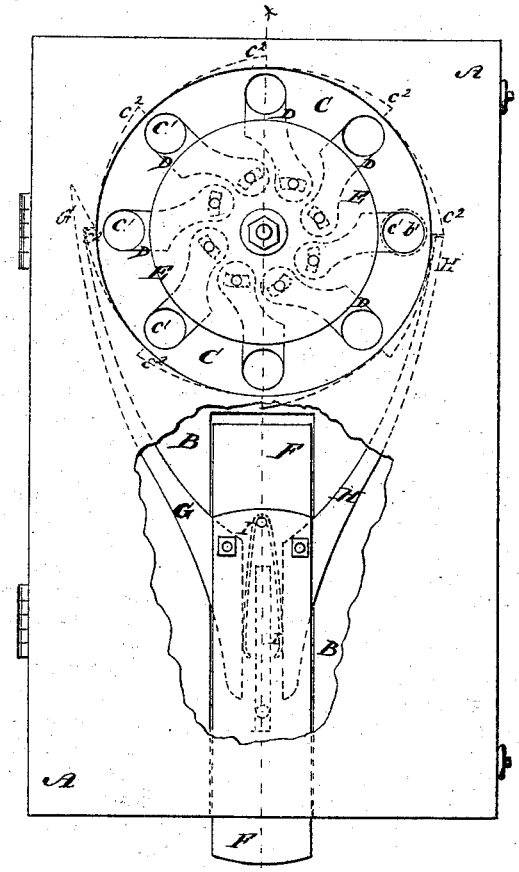
Figure 2:
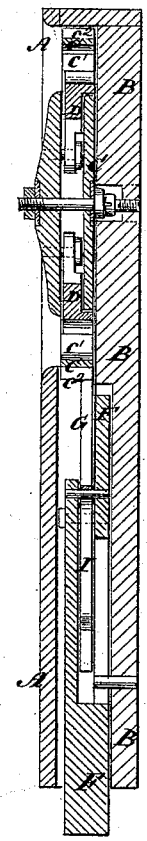
Figure 3:
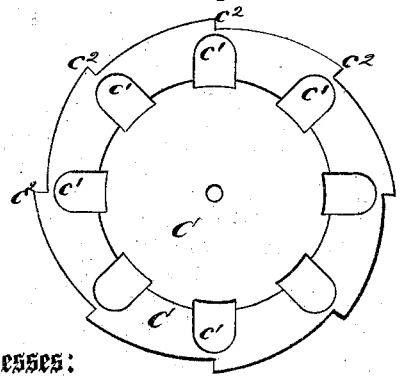
Figure 4:
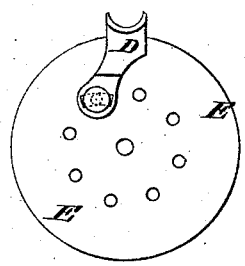

Be it known that I, FRANK W. YOUNG, of Holden, in the county of Johnson and State of Missouri, have invented a new and useful Improvement in Seed-Dropper for Corn-Planter, of which the following is a specification:

Figure 1 is a top view of my improved seed-dropper, part being broken away to show the construction. Fig. 2 is a detail section of the same taken through the line $x\ x$, Fig. 1. Fig. 3 is a detail view of the lower or main part of the dropping device. Fig. 4 is a detail view of the under side of the upper disk and one of the adjustable arms.

Similar letters of reference indicate corresponding parts.

My invention has for its object to furnish an improved seed-dropper for corn-planters which shall be simple in construction and reliable in operation, and so constructed that the size of the dropping-apertures may be conveniently adjusted to any desired extent, according to the amount of seed required to be dropped at a time; and it consists in the pivoted arms and pivoted disk, in combination with the pivoted wheel provided with dropping-holes, as hereinafter more fully described.

A B are two boards that form the bottom of a seed-hopper, and between which is placed a wheel, C, which is pivoted at its center to the lower board B. In the upper board A is formed a round hole, of such a size that the edge of said board A may slightly overlap the upper edge of the wheel C, so that the seed may rest upon the board A and wheel C, but cannot get into the space between the boards A B. Through the wheel C, near its outer edge, is formed a circle of holes or slots, $c^1$, the outer parts of which are semicircular. The upper ends of the holes $c^1$ are open, so as to receive seed from the hopper, and their lower ends are closed by the board B, so that the seed cannot escape from the said holes until each hole $c^1$ comes over a hole, $b'$, in the board B, through which it escapes to the ground. The middle part of the upper side of the wheel C is recessed to receive the arms D, which are made in about the form shown in Figs. 1 and 4, and are pivoted to the under side of the disk E, so that they may be drawn inward or pushed outward by turning the disk E in one or the other direction. The outer ends of the arms D are concaved, and enter the inner part of the holes $c^1$, so that the dropping-apertures may be enlarged or diminished by the inward and outward movement of the arms D. The disk E is placed upon the pivot of the wheel C, and, when adjusted, is clamped to said wheel C by a nut screwed upon the upper end of said pivot. Upon the edge of the wheel C are formed as many ratchet-teeth $c^2$ as there are dropping-holes $c^1$ in said wheels, as shown in Figs. 1 and 3. F is a sliding bar, to which a reciprocating movement is given in the ordinary manner and by the ordinary means. The end of the bar F enters a guide-groove in the space between the boards A B, and to it are pivoted two pawls, G H. The forward end of the pawl G has a hook formed upon it to take hold of the ratchet-teeth $c^2$ of the wheel C, and turn said wheel as the bar F is moving outward. The forward end of the other pawl H is so formed as to take hold of the ratchet-teeth of the wheel C as the bar F is moved inward. The movement of the bar F is so adjusted that the wheel C, at each movement of said bar F, will be turned a distance equal to the space between two adjacent holes, $c^1$. The forward or engaging ends of the pawls G H are held against the wheel C by a U or other spring, I, placed between the other or rear ends of said pawls, as shown in Fig. 1.

Having thus described my invention, I claim as new and desire to secure by Letters Patent—

The pivoted arms D and pivoted disk E, in combination with the pivoted wheel C provided with dropping-holes $c^1$, substantially as herein shown and described, and for the purpose set forth.

FRANK W. YOUNG.

Witnesses:
   WILLIAM W. VAN MATRE,
   W. S. GREGORY,
   WILLIAM C. SMITH.